United States Patent
Bigler et al.

[11] Patent Number: 5,912,541
[45] Date of Patent: Jun. 15, 1999

[54] INTEGRATED DC SERVO MOTOR AND CONTROLLER

[76] Inventors: Robert A. Bigler; Punita Pandit Bigler, both of 11230 Bubb Rd., Cupertino, Calif. 95014

[21] Appl. No.: 08/754,182

[22] Filed: Nov. 22, 1996

Related U.S. Application Data

[63] Continuation of application No. 08/347,807, Nov. 30, 1994, abandoned.

[51] Int. Cl.⁶ ............................................. H02P 5/06
[52] U.S. Cl. ..................... 318/600; 318/538; 318/625
[58] Field of Search .................... 318/565, 685, 318/616, 634, 640, 538, 254, 138, 439, 600, 625; 310/47, 50, 42, 67 R, 68 R, 68 B, 58; 439/44, 631

[56] References Cited

U.S. PATENT DOCUMENTS

| | | |
|---|---|---|
| Re. 34,064 | 9/1992 | Tury et al. .............................. 74/335 |
| 3,767,206 | 10/1973 | Rehklau et al. ........................... 243/3 |
| 3,809,935 | 5/1974 | Kristen et al. ........................... 310/68 |
| 4,060,310 | 11/1977 | Brown ..................................... 160/310 |
| 4,160,200 | 7/1979 | Imamura et al. ...................... 318/616 |
| 4,501,460 | 2/1985 | Sisler .................................... 339/49 R |
| 4,517,481 | 5/1985 | Breining ................................. 310/71 |
| 4,779,031 | 10/1988 | Arends et al. ......................... 318/565 |
| 4,788,658 | 11/1988 | Hanebuth ............................... 364/900 |
| 4,947,071 | 8/1990 | Clarke ..................................... 318/254 |
| 4,988,905 | 1/1991 | Tolmie, Jr. ............................ 310/68 B |
| 5,006,703 | 4/1991 | Shikunami et al. ................ 250/231.13 |
| 5,006,744 | 4/1991 | Archer et al. ........................... 310/89 |
| 5,038,088 | 8/1991 | Arends et al. ......................... 318/565 |
| 5,070,289 | 12/1991 | Pona et al. ............................. 318/640 |
| 5,107,387 | 4/1992 | Orton ..................................... 361/33 |
| 5,136,452 | 8/1992 | Orton ..................................... 361/33 |
| 5,159,218 | 10/1992 | Murry et al. ......................... 310/68 B |
| 5,160,925 | 11/1992 | Dailey et al. ......................... 340/853.3 |
| 5,170,851 | 12/1992 | Kress et al. ............................. 310/47 |
| 5,237,540 | 8/1993 | Malone ................................... 367/81 |
| 5,249,161 | 9/1993 | Jones et al. ............................ 367/83 |
| 5,287,028 | 2/1994 | Suzuki et al. .......................... 310/71 |
| 5,311,400 | 5/1994 | Fuchs et al. ............................ 439/44 |
| 5,321,585 | 6/1994 | Trittschchuh, III et al. ........... 361/784 |
| 5,327,064 | 7/1994 | Arakawa et al. ..................... 318/801 |
| 5,408,154 | 4/1995 | Meiser et al. ........................... 310/71 |
| 5,428,470 | 6/1995 | Labriola, II .......................... 359/119 |
| 5,455,734 | 10/1995 | Foreman et al. ..................... 318/118 |
| 5,504,940 | 4/1996 | Hahs, Jr. et al. ..................... 455/38.1 |
| 5,532,533 | 7/1996 | Mizutani ............................. 310/68 B |
| 5,618,188 | 4/1997 | Gilmore et al. ........................ 439/91 |

FOREIGN PATENT DOCUMENTS

| | | |
|---|---|---|
| 4120665A1 | 12/1992 | Germany. |
| 60-102839 | 6/1985 | Japan. |
| 2-211039 | 8/1990 | Japan. |

OTHER PUBLICATIONS

Product Brochure of Forcam, Inc., "Smart Motor Positioning Systems: Computerize the Setup of Your Machines", 1994.

*Primary Examiner*—Bentsu Ro
*Attorney, Agent, or Firm*—Thomas Schenck; Mark Protsik

[57] ABSTRACT

An integrated motion control device having a controller mated to a motor body with a set of rigid, electrically conductive signal pins. The motor is direct-current and preferably brushless, and has Hall sensors within the motor body and an encoder at a back end for precisely determining rotor position. Signals from the Hall sensors and encoder are fed to a microprocessor contained in the controller and including a PID filter for servo control of the motor. The controller contains an amplifier for driving the motor and a power supply for providing appropriate levels of DC power to various elements of the controller and motor. All electrical signals between the motor and controller are transmitted via the pins, eliminating wiring harnesses of the prior art and related signal noise and wiring problems. The motor body and controller are affixed with a few screws, allowing the controller to be removed from the motor while the motor remains connected to an application. Communication ports are provided at a rear of the controller for connection to a computer or peripheral devices, and can be used to daisy-chain and synchronize a number of interconnected motors and controllers.

35 Claims, 3 Drawing Sheets

INTEGRATED DC SERVO MOTOR AND CONTROLLER

This application is a continuation of application Ser. No. 08/347,807 filed on Nov. 30, 1994, now abandoned.

TECHNICAL FIELD

This invention relates generally to the field of DC motors and controls for such motors.

BACKGROUND ART

DC motors are well known and used in a wide variety of functions and industries. In general, such motors utilize a changing magnetic field that causes an inner shaft or rotor to rotate relative to an outer body or stator, which is usually fixed. Typically, the rotor is permanently magnetized, while a series of poles encircles the rotor, the poles wound with wire or "windings" so as to create a magnetic field when current flows in the wire. Current is supplied to the windings to create a magnetic field near the poles that attracts or repels the rotor, causing the rotor to revolve.

To better control the motion of the rotor, information regarding actual or measured parameters of the motion can be used to vary the input current in order to approach or achieve desired motion values. Such a servo control system may employ a microprocessor, power supply and amplifiers for controlling the current to the windings, position or motion detectors for determining the actual position or motion of the rotor, and wires for relaying signals between the controller, amplifiers, windings, detectors and power supply. For some applications it is desirable to have a motor in close proximity to a controller.

For example, in U.S. Pat. Nos. 5,107,387 and 5,136,452, Orton discloses a radio controlled model race car having a controller coupled to a DC motor used to drive the car, and various fuse and circuitry devices for connecting the motor and controller and for braking the motor. U.S. Pat. No. 5,237,540, to Malone teaches a brushless DC motor used for drilling having an encoder coupled to the motor for sensing a position of the motor. Similarly, U.S. Pat. No. 5,249,161 to Jones et al. dis-closes a borehole driller having means for determining whether an encoder and position sensor attached to the motor is jammed. In U.S. Pat. No. 5,159,218, Murry et al. teach a solid state controller mounted directly to a brushless DC motor for pumping fluids in environments which may be encountered during space missions.

Having a controller close to a motor may still require extensive interwiring. As shown in FIG. 7, a typical servo motor control system has a motor 20 with an encoder 22 attached to the motor for determining the position of the motor 20. A servo controller 25 and an amplifier 27 are separated from the motor 20 and encoder 22, but connected by a multiplicity of wires. The servo controller 25 is supplied with power and ground wires 30, and the servo controller 25 is wired to a host via separate transmit and receive wires as well as a ground 32. The amplifier 27 is separately supplied with power and ground wires 33, and has a number of potentiometers 28 for adjusting the amplifier 27. The servo control 25 and the amplifier 27 are connected with a set of wires 35 including those for a command signal, a shutdown signal, an error signal and ground. Wire connections 37 between the encoder 22 and the servo controller 25 include power and ground and six signal wires. Wires 39 connecting between the motor 20 and the amplifier 27 include a power and a ground wire for a Hall sensor in the motor 20, a pair of Hall sensor signal wires, and individual wires for three motor phases. The web or harness of wiring shown in this figure may be difficult to correctly connect and noise from high current wires powering the motor may disrupt sensitive signals in nearby wires used for servo control.

It is an object of the present invention to provide a simple and reliable servo motor having improved precision of motion due to improved mechanical and electrical connection between the motor and controller.

SUMMARY OF THE INVENTION

The above object is accomplished with a controller that is mated to a DC motor with a set of rigid, electrically conductive pins protruding from a back end of the motor. Both the motor and the controller are modular, providing for ease of interchange or replacement of either the motor or controller. The pins provide mechanical as well as electrical connection between the motor and controller. Electrical connection of the pins to the controller allows communication of power and control signals for the motor from the controller, and communication of data regarding measured positions of the motor for the controller.

The motor may employ brushes, although in a preferred embodiment it is brushless, as a brushless motor provides improved heat dissipation from the coils of a stationary, exterior housing rather than the coils of a rotating armature found with brushes. A rotor protrudes from a front end of the motor, while mounted on a back end of the motor is an optical encoder for measuring incremental positioning of a rotor relative to the motor housing. The encoder has leads which, like the pins, extend from the back end of the motor to fit into matching connections in the controller. The motor includes Hall sensors for determining local magnetic fields within the motor for absolute position measurement of the rotor.

Unlike typical servo motors, the motor of the present invention can remain connected with an application while the controller is removed for adjustment or replacement. Aside from the pins, the motor and controller are held together with three screws which can be easily removed. The controller is of the same diameter as the motor, and in a preferred embodiment extends about as far as an encoder of the prior art, allowing use in tight spots that are increasingly common in modern motion control applications.

The controller includes a microprocessor with a servo amplifier for driving the motor and a proportional integral derivative (PID) filter for controlling the motor based upon feedback from the motor. The controller has a communications port that may be accessed by an RS232 plug from a personal computer. Two or more controllers can be linked together via their communication ports to provide multi-axis motion with the controllers and their connected motors synchronized. A peripheral device port located adjacent to the communications port on a back end of the controller affords connections for devices such as a flat panel display, which may be mounted on the controller and display information regarding the motor or controller, or joystick for controlling the motor.

The modular, mated combination of motor and controller reduces wiring and electronic connections, offering space savings and improved reliability. The reduction in wiring benefits the accuracy of motor control by reducing signal interference in critical drive and servo control functions. Space savings and convenience also result from the compact structure and lack of electronic components that require mounting and interconnection.

BEST MODE FOR CARRYING OUT THE INVENTION

Figure 1:
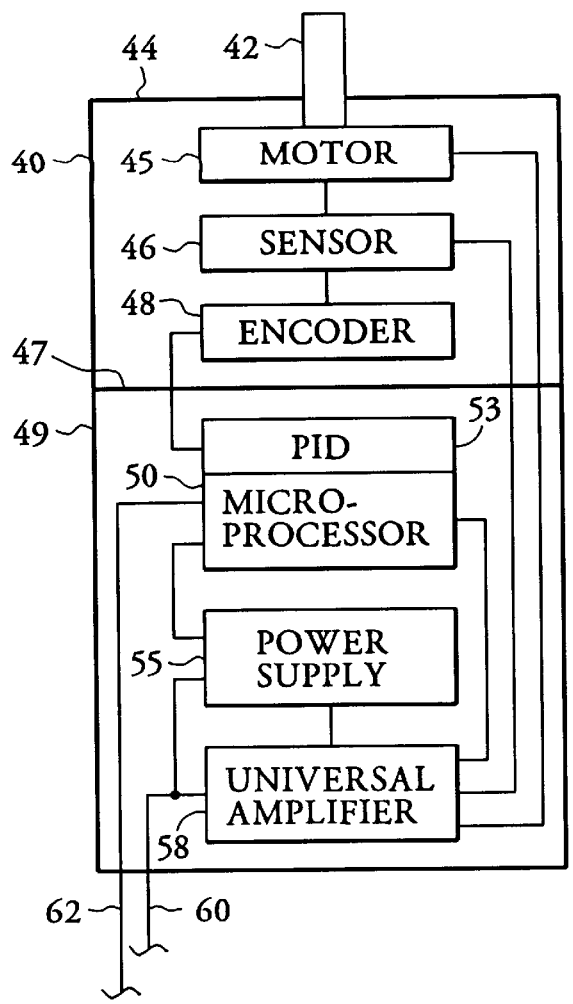
FIG. 1 is a plan view of a combined motor body and controller of the present invention.

Referring now to FIG. 1, a motor body 40 is shown with a rotor 42 protruding from a front end 44 of the body 40. Within the body 40 is a motor 45 and a Hall sensor 56. At a back end 47 of the motor body 40 is an encoder 48. A controller 59 adjoins the back end 47 of the body 40. The controller 49 houses a microprocessor 50 including a proportional integral derivative (PID) filter 53. The controller 49 also contains a power supply 55 and a universal amplifier 58. Direct current (DC) power of 18 to 48 volts is provided to the controller 49 through a power input 60, and RS-232 or other formatted signals are provided to the controller 49 via a communications port 62.

The power input 60 is connected to the power supply 55 and the amplifier 58. The power supply 55 stores power and provides various levels of DC power as needed to different elements of the controller 49, including the microprocessor 50 and the amplifier 58. Signals input to the microprocessor 50 via the communications port 62 are used to run the motor 45 by controlling the current supplied to the motor from the amplifier 58. A position of the motor 45 is measured by the sensor 46 and encoder 48 and information regarding this position is sent to the microprocessor 50 for servo control of the motor 45.

Figure 2A:
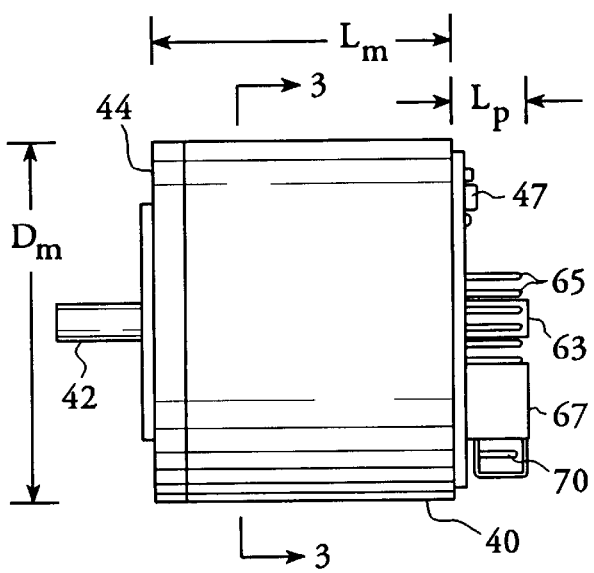
FIG. 2A is a side view of the motor body of FIG. 1.
Figure 2B:
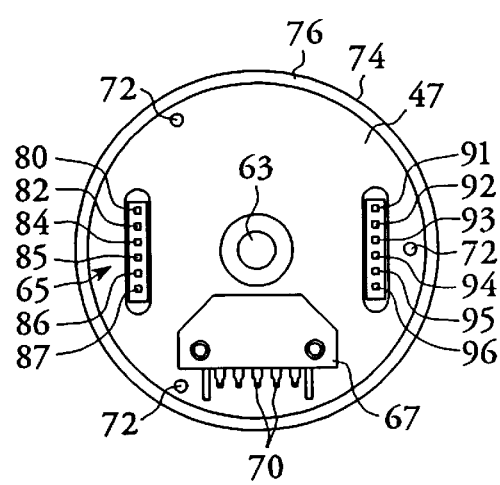
FIG. 2B is a rear view of the motor body of FIG. 1.

FIGS. 2A and 2B show some elements of the motor body 40 that connect with the controller 49. The body 40 is generally cylindrical, with the axially disposed rotor 42 protruding from the front end 44 and a rotor tail 63 extending from the back end 47. A set of rigid, electrically conductive, stainless steel pins 65 protrude from the back end 47 adjacent to the rotor tail 63. The pins 65 are grouped in a parallel pair of rows that are vertically oriented and centered horizontally beside the rotor tail 63. An encoder 67 is disposed adjacently below the rotor tail 63, and has a series of electrical leads 70 that extend away from the back end 47 in a direction substantially parallel to the rotor tail 63 and the pins 65. The encoder 67 directs light at the rotor tail 63, which is marked to reflect light from certain spots and not from others, and the encoder 67 detects reflected light from the tail 63 in order to determine an incremental position of the rotor 42. Data regarding this position is sent to the controller 49, shown in FIG. 1, via the leads 70. Three tapped screw holes 72 are located near a perimeter 74 of the back end 47 for affixing the controller 49 to the motor body 40. An annular recess 76 is disposed at the perimeter 74 for axial alignment of the controller 49.

In the preferred embodiment, the motor body 40 has a length $L_m$ that lies within a range of between 1 inch and several inches, optimally about 2 inches, and a similar outside diameter $D_m$, optimally about 2.25 inches. The optimal motor body 40 size is designed to accommodate standard NEMA 23 frame dimensions and tolerances, allowing retrofit of existing 23 size stepper motors. For this size, the pins 65 have a length $L_p$ of approximately 0.5 in. and a cross-sectional area of 0.025 square inches. The rows of pins 65 are spaced about 1.5 inch from each other on opposite sides of the rotor tail 63, each row having 6 pins with centers spaced apart by about 0.1 inch.

A first pin 80 provides 5 volts DC power to the motor 45 from the controller 49, while a second pin 82 provides a return path for that power. A third pin 84 offers a ground connection for the body 40. The other three pins 85, 86, and 87 in that row are connections for three Hall sensors, not shown, that provide signals to the controller 49 regarding the magnetic field within the motor 45, measured by transverse electrical current, thereby measuring a general position of the rotor 42. The six pins 65 in the opposite row, labeled 91, 92, 93, 94, 95 and 96 provide power to a set of six windings, which encircle the rotor 42 within the motor 45, providing changing magnetic fields to power the rotor 42.

Figure 3:
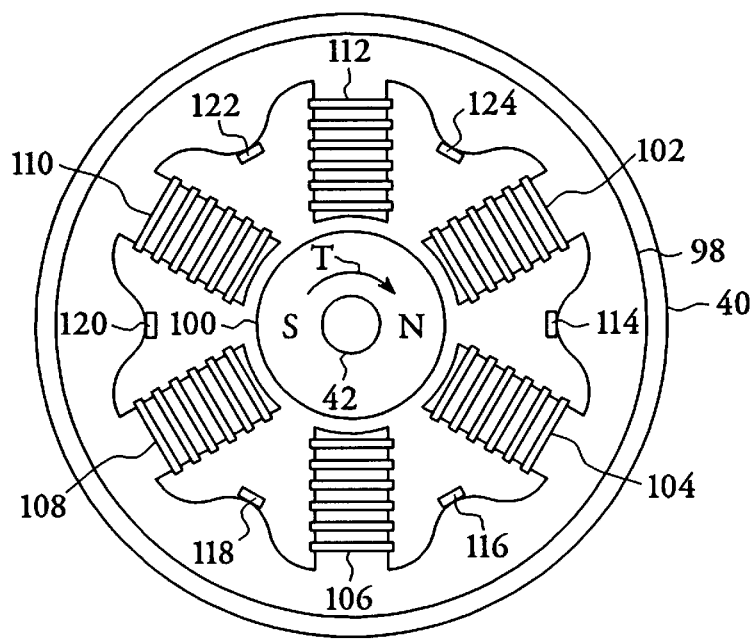
FIG. 3 is a cross-sectional view of the motor body of FIG. 2A and 2B.

FIG. 3 shows a simplified axial view of a portion of the motor body 40 containing the motor 45 with a stator 98 outside and the rotor 42 at the center. The rotor 42 is attached to a cylindrical permanent magnet 100 having a diameter larger than that of the rotor 42 and opposed north (N) and south (S) poles. Six windings, labeled 102, 104, 106, 108, 110, and 122 surround the permanent magnet 100, with adjacent windings being oppositely wound and thus producing oppositely directed magnetic fields when supplied with electrical current. The windings are connected as pairs so that current flows through a pair of adjacent windings simultaneously to provide a torque to the magnet 100 and thereby turn the rotor 42. For example, pins 91 and 92 (FIG. 2B) provide and drain current from windings 102 and 104, respectively. Winding 102 is oriented so that current provided by from pin 91 creates a magnetic field having a north pole directed toward the rotor 42 and a south pole directed away from the rotor 42. Current from winding 102 flows to winding 104 by a wire, not shown, and drains from winding 104 through pin 92. Winding 104 is oriented so that this current creates a magnetic field with a south pole directed toward the rotor 42. With the north pole (N) of the magnet 100 oriented as shown in FIG. 3, the just described current in windings 102 and 104 produces a torque T that tends to cause magnet 100 and rotor 42 to rotate in a clockwise direction.

After the magnet 100 and rotor 42 have rotated clockwise around a third of a revolution another pair of windings, 106 and 108 are provided current in a similar manner through pins 93 and 94, creating magnetic fields that provide further torque for rotation in the clockwise direction. Windings 110 and 112 are activated similarly by current through pins 95 and 96 to provide further torque for further acceleration of rotation. The direction of torque is reversible simply by supplying current in an opposite direction through the pairs of windings while the north pole (N) is adjacent to those windings, or alternatively, by supplying current in the original direction while the south pole (S) is adjacent to the windings supplied with current. Thus it is important to know the position of the magnet 100 at any time in order to provide torque impelling the rotor 42 in one direction or another.

Disposed between each pair of windings are Hall sensors 114, 116, 118, 120, 122 and 124. The Hall sensors are transistors that transmit a current in response to an ambient magnetic field of a particular orientation, and are employed to detect the position of the magnet 100. oppositely disposed Hall sensors 114 and 120, 116 and 122, and 118 and 124 have signals that are compared by comparators for determining a general position of the magnet 100 and rotor 42. The encoder 48 can determine two thousand incremental positions of the rotor 42, and the information from the Hall sensors 114, 116, 118, 120, 122 and 124 and the data from the encoder 48 are fed to the microprocessor 50, which calculates the position and velocity of the rotor 42. The microprocessor 50 includes a proportional integral derivative (PID) filter 53 which receives information from the encoder 48 to servo control the rotor 42. The PID filter has a service rate of 5 kHz, providing extreme accuracy in servo control.

Figure 4A:
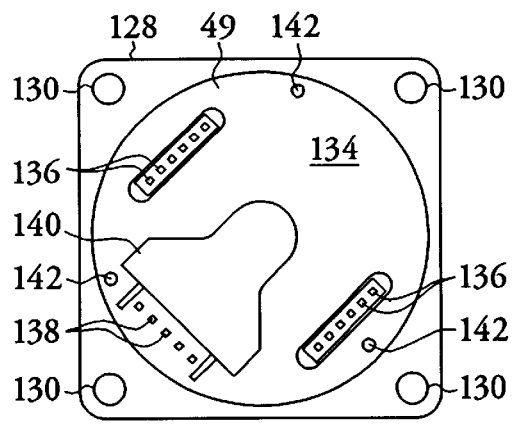
FIG. 4A is a front view of the controller of FIG. 1 with a mounting flange attached at the rear end.
Figure 4B:
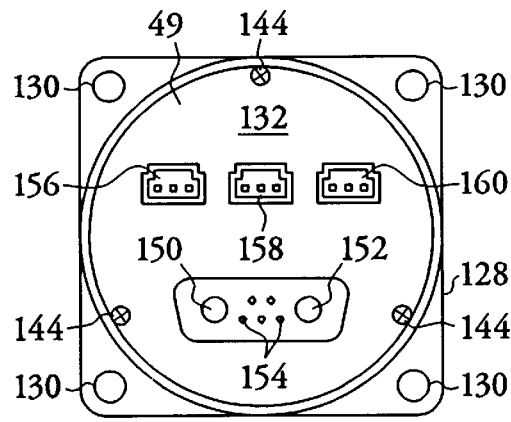
FIG. 4B is a rear view of the controller and flange of FIG. 4A.

Referring now to FIGS. 4A and 4B, front and rear views of the controller 49 show a square flange 128 which is attached to a rear end 132 of the controller 49, the flange 128 having bolt holes 130 near its corners to allow mounting of the controller 49 to a work surface, not shown. A front end 134 of the controller 49 has 12 pin holes 136 configured in a parallel pair of rows, the pin holes 136 mating with the pins 65 of the motor body 40. Another row of sockets 138 mates with the pins 70 from the encoder 67. The front end 134 has a recess 140 to allow for the extension of the rotor tail 63 and the encoder 67 from the back end of the motor body 40. A triad of apertures 142 allows passage of screws 144 from the rear end 132 to the screw holes 72, for attachment of the controller 49 to the motor body 40. The controller 49 can be removed from the motor body 40 by simply unscrewing these screws 144 and pulling the pins 65 and 70 free, allowing the motor body 40 to remain attached to an application while the controller is removed for repair or replacement.

The rear end 132 of the controller 49 contains a number of electrical ports providing power and communication to the controller 49. DC power of from 5 to 18 volts is provided to power socket 150 and drained from power socket 152. A set of sockets 154 compatible with RS-232 or other computer communication cabling provides capability to program or change settings of the controller 49 via a personal computer or other compatible device. These sockets 154 also allow interconnection between a plurality of controllers 49 and attached motor bodies 40 to perform coordinated tasks. A synchronization pin located within each controller 49, not shown, allows a plurality of controllers 49 and their associated motors 45 to be perfectly synchronized despite the small delays inherent in RS-232. Interconnected motor bodies 49 can be held by their associated controllers 49 by mounting on a work piece, not shown, so that their rotors 42 are oriented in different directions or along different axes to provide precisely controlled quantities of motion in any direction. A left limit port 156 provides control of motion of the rotor in a clockwise direction while a right limit port 158 sets a limit on motion in a counterclockwise direction. A peripheral port 160 provides the opportunity to link peripheral devices such as joysticks, mice, displays or push-wheel inputs.

Figure 5:
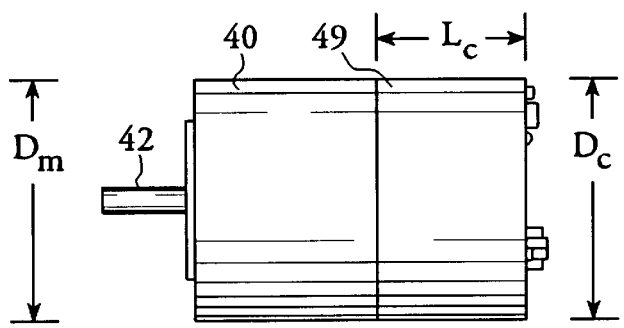
FIG. 5 is a side view of the combined motor and controller of FIG. 1.

FIG. 5 displays the controller 49 attached to the motor body 40, demonstrating that the controller 49 adds little to the length of the motor body beyond that typically assumed by an encoder of the prior art. The controller 49 has a length Lc that may range from about 1 inch to several inches, depending primarily upon the number of circuit boards stacked within the controller 49. The diameter of the controller Dc can be seen to match the diameter $D_m$ of the motor body 40, allowing the mated body 40 and controller 49 to fit in a similar lateral space as the motor body 40 would fit in alone.

Figure 6:
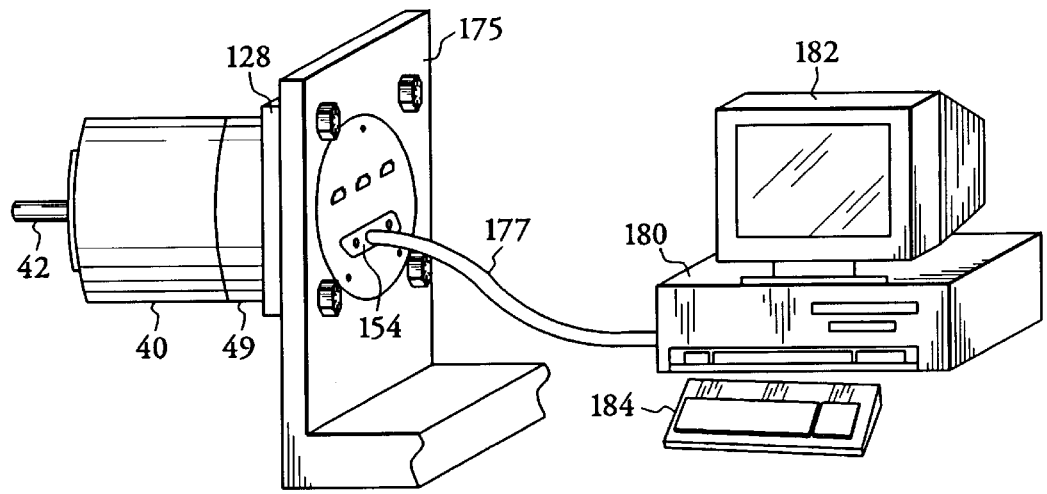
FIG. 6 is a plan view of a computer connected to a mounted motor and controller of FIG. 1.

FIG. 6 shows the motor body 40 and controller 49 attached by the flange 128 to a support 175. An RS-232 cable 177 is connected through a hole in the support, to the RS-232 port 154 of the controller, and also connected to a personal computer 180. Information regarding parameters of the motion of the rotor 42 can be displayed on a terminal 182 connected to the computer 180. A keyboard 184 is used to input desired motion parameters into the computer 180 which inputs data into the controller 49 to precisely control the rotor 42. There is a large amount of information that a controller 49 can volunteer to a host computer 180 or peripheral display, not shown. This information includes an actual position, velocity, encoder error and motor status, which is sent over the cable 177 as a byte of information.

The position, velocity or acceleration of the rotor 42 can be programmed into the controller 49 with up to 32 bits of precision in any of those parameters, yielding extremely fine resolution. Numeric resolution doubles with each additional bit. Thus a 32 bit quantity does not have twice the resolution of a 16 bit quantity, but instead has 65,536 times that resolution. As an example, when photographying a distant star by opening a shutter of a telescope camera that is set to rotate as the earth rotates, resolution becomes very important. If an astronomer calculates that a rotation of 0.00294785 rpm is needed for this purpose and a 16 bit resolution control system chops off the last 3 digits, the picture that results will be a dash, not a dot. With a 32 bit system, in between each velocity at which a 16 bit system could track are 65,536 more velocities to choose from.

This extreme resolution allows for very accurate linear interpolation of many cascaded integrated motors 45 and controllers 49. It is essential in this case to assure that all the rotors 42 start at the same time. Millisecond delays of RS-232 can degrade synchronization, and are averted by first inputting commands for the chain of motors 45 into the microprocessors 49 and then using internal timers of the microprocessors 49 and synchronization pins to initiate motion of each of the rotors 42 simultaneously.

Figure 7:
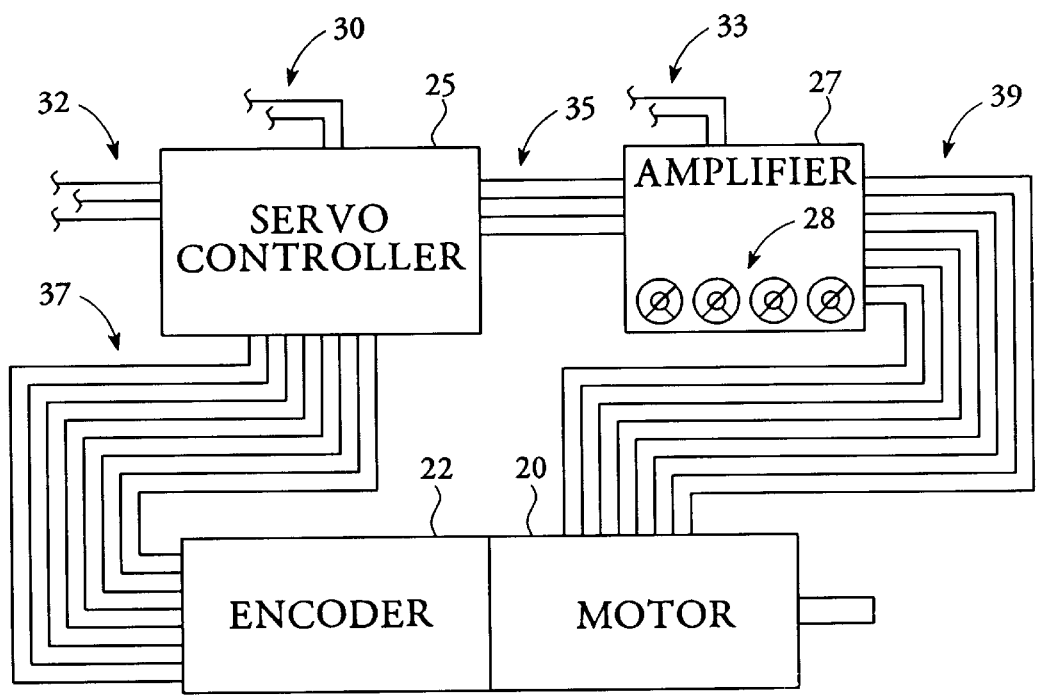
FIG. 7 is a plan view of a prior art motion control device.

Language used to input desired motion parameters to a motor 45 and controller 49 follows common sense terminology. Thus the letter "P" stands for position, "V" for velocity, and "A" for acceleration. Data is digitally transferred and maintained, eliminating errors inherent in analog systems, and eliminating adjustment of potentiometers 28 shown in the prior art of FIG. 7. When a command is intended to transfer data, that data follows the command as ASCII characters like "P3000" to set a target absolute position of 3000 encoder counts. If several motors are cascaded, this letter command is preceded by the address of the particular motor being contacted. There are four modes that a motor 45 can operate in: Absolute Position, Relative Position, Velociy and Torque. A current "I" command limits the current available to the motor in 1000 increments up to a peak current of 12.5 amps.

The benefits of the mated, modular controller 49 and motor body 40 are numerous. Complete elimination of the need for local hand wiring reduces cost and increases reliability. Elimination of the necessity of mounting the separate components saves money, time and space. Elimination of the need to match, procure and inventory separate components adds to this savings. Elimination of potentiometers and other analog settings removes servo engineers from assembly lines and assures uniformity across different units and over time.

We claim:

1. A digitally controlled integrated motor device comprising, a body housing a direct-current motor having a rotor, a stator and means for sensing motion of said rotor relative to said stator, defining sensed motion, and an encasement housing a controllers with said encasement having a cross-sectional area equal to a cross-sectional area of said body, said encasement being removably connected to said body, said controller being in electrical communication with both said motor and said sensing means and including a proportional integral derivative servo control system, drive means, in data communication with said proportional integral derivative servo control system, for producing a selected quantity of motion by said rotor, means for digitally storing data corresponding to motion parameters, said motion parameters including velocity and acceleration of said rotor with respect to said stator, and means, in data communication with both said sensing means and said storing means, for deriving variations between said sensed motion and one of said motion parameters, with said proportional integral derivative servo control system being adapted to sense said variations and produce an actuation signal corresponding thereto to vary an operation of said drive means to move said rotor in accordance with said motion parameters.

2. The device of claim 1 further including a plurality of rigid pins protruding from said body and a plurality of corresponding holes formed in said controller, forming a plurality of wireless connections, with all electrical communication between said motor and said controller occurring through said plurality of wireless connections.

3. The device of claim 1 wherein said drive means includes an amplifier connected to a power supply and controlled by said deriving means, with said storing means adapted to contain up to 32 bits of information corresponding to each of said motion parameters.

4. The device of claim 1 wherein said sensing means includes an encoder attached to said body and connected to said controller, said encoder in signal communication with said microprocessor.

5. The device of claim 1 wherein said rotor includes a magnet and said motor includes a plurality of hall sensors to sense a polarization of said magnet, with said hall sensors being in data communication with said deriving means.

6. The device of claim 1 wherein said sensing means is adapted to sense two thousand incremental positions of said rotor.

7. The device of claim 1 wherein said body and said controller are essentially cylindrical and have substantially similar diameters.

8. The device of claim 1 wherein said proportional integral derivative servo control system is adapted to operate at 5 kHz.

9. The device of claim 1 wherein said sensing means comprises of an optical encoder with said encasement defining a recess adapted to receive said rotor and said optical encoder upon said encasement being attached to said body, thereby shielding said encoder from ambient light.

10. The device of claim 1 wherein said sensing means precisely determines a plurality of positions of said rotor relative to said stator.

11. The device of claim 1 further including a plurality of first and second complementary connectors, with said plurality of first connectors rigidly attached to said body and in electrical communication with said motor and said plurality of second connectors rigidly attached to said encasement and in electrical communication with said controller, said first and second plurality of connectors being coupled together, providing electrical communication between said motor and said controller.

12. A digitally controlled integrated motor device comprising, a modular body housing a direct-current motor with a moveable rotor protruding from said body in a first direction and a plurality of rigid, electrically conductive pins protruding from said body in a second direction, said body including encoder means for sensing motion of said rotor compared to said body, a modular control unit having a plurality of holes fitting said pins, said control unit having a cross-sectional area equal to a cross-sectional area of said body, said modular control unit including a proportional integral derivative servo control system, a microprocessor, in data communication with both said encoder means and said control system via said pins, drive means, in data communication with said microprocessor and said proportional integral derivative servo control system, for moving said rotor in response to signals received from said microprocessor, and means for digitally storing data corresponding to motion parameters, said motion parameters including velocity and acceleration of said rotor with respect to said stator, wherein said drive means moves said rotor, with said encoder means transmitting information concerning motion of said rotor to said microprocessor, and said microprocessor determining variations between said motion sensed and one of said motion parameters and transmitting the same to said proportional integral derivative servo control system, with said proportional integral derivative servo control system transmitting a signal to said drive means to remove or reduce said variation determined.

13. The device of claim 12 wherein said control unit includes a communications port disposed distal to said holes for programming said microprocessor.

14. The device of claim 12 wherein said rotor is electrically insulated from a stator contained in said body.

15. The device of claim 12 wherein said storing means adapted to contain up to 32 bits of information corresponding to each of said motion parameters and said rotor includes a magnet and said motor includes a plurality of hall sensors to sense a polarization of said magnet, with said hall sensors being in data communication with said microprocessor.

16. The device of claim 12 wherein said encoder means is adapted to sense two thousand incremental positions of said rotor.

17. The device of claim 12 wherein said encoder means is in optical communication with said rotor and includes a source of light and a light detector, with said rotor formed with a plurality of surfaces having differing reflectivity, each of which corresponds to an angular position of said rotor different than an angular position with which the remaining surfaces correspond, wherein an angular position of said rotor is determined by said encoder means detecting an intensity of light reflected from said rotor.

18. A digitally controlled integrated motor device comprising, a body housing a direct-current motor having a rotor, a stator and means for determining a position of said rotor relative to said stator, said determining means including an encoder in optical communication with said rotor, said encoder including a source of light and a light detector, with said encoder adapted to transmit data corresponding to angular positions of said rotor with respect to said stator, defining sensed motion, and an encasement housing a controllers with said encasement having a cross-sectional area equal to a cross-sectional area of said body, said encasement being removably connected to said body, said controller being in electrical communication with both said motor and said encoder, and including a proportional integral derivative servo control system, a drive means, in data communication with said proportional integral derivative servo control system, for producing a selected quantity of motion by said rotor, means for digitally storing data corresponding to motion parameters, said motion parameters including velocity and acceleration of said rotor with respect to said stator, and means, in data communication with both said encoder and said storing means, for deriving variations between said sensed motion and one of said motion parameters, with said proportional integral derivative servo control system, being adapted to sense said variations and produce an actuation signal corresponding thereto to vary an operation of said drive means to move said rotor in accordance with said motion parameters.

19. The device of claim 18 wherein electrical signals travel between said body and said controller essentially only via signal pins.

20. A digitally controlled, integrated motor device, comprising:
a modular motor body housing a direct current servo motor having a rotor and a stator;
an encoder associated with said servo motor and adapted to sense incremental angular positions of said rotor with respect to said stator, said encoded transmitting incremental position data corresponding to sensed motion of said rotor; and
a modular control unit in the form of an encasement, removably connected to said motor body in mating relationship therewith, said encasement housing a controller with a drive amplifier for said motor whereby said motor, encoder, controller and drive amplifier form a fully integrated compact unit within said motor body and encasement, said controller including a microprocessor in data communication with a communications port on said encasement to receive one or more digital motion parameter commands from an external source through said port, available motion parameter commands that can be received including a set of commands that indicate a desired position, velocity and acceleration of said rotor, said microprocessor also in data communication with said encoder to receive said incremental position data transmitted from said encoder, said microprocessor having means for digitally storing said received motion parameter commands, continually calculating and updating an actual rotor position from said received incremental position data, determining variations between the desired position or motion of said rotor corresponding to said stored motion parameter commands and the calculated actual position of said rotor, and producing an actuation signal to direct motion of said rotor in accordance with said motion parameter commands, said controller also including a proportional-integral-derivative (PID) servo control system in data communication with said encoder to receive said incremental position data therefrom and in data communication with said microprocessor to receive said actuation signal therefrom, said PID servo control system responsive to said incremental position data and said actuation signal to control operation of said drive amplifier, said drive amplifier in electrical communication with said motor to supply current to said stator to move said rotor in accordance with said motion parameter commands.

21. The motor device of claim 20 wherein said servo motor is a brushless motor wherein said rotor is electrically insulated from said stator and includes a magnet, and wherein current supplied to windings of said stator generates a magnetic field that drives said rotor, said motor further including a plurality of Hall sensors to sense an orientation of said rotor magnet, said Hall sensors being in data communication with said PID servo control system.

22. The motor device of claim 20 wherein said encoder is an optical encoder including a source of light, a position indicator associated with said rotor having a plurality of optically contrasting portions thereon corresponding to different angular positions of said rotor, and a light detector positioned to detect changes in intensity of light received from said source via said position indicator portions.

23. The motor device of claim 20 wherein said encoder is adapted to sense at least 2000 incremental angular positions of said rotor.

24. The motor device of claim 20 wherein said motion parameter commands indicate desired position, velocity and acceleration with a resolution up to 32 bits, said storing means adapted to contain said 32-bit motion parameter command information.

25. The motor device of claim 20 wherein said data and electrical communication between elements associated with said modular motor body and elements associated with said modular control unit are provided by a plurality of wireless complementary pin-and-hole connections fixed to the respective modules in mating relationship.

26. A motor and controller to be operated by a digital computer through a communications port for bringing a rotor of the motor to a target position comprising,
a motor having a rotor disposed within a first housing,
a rotor position encoder associated with the rotor, the encoder producing an electrical signal indicating the measured position of the rotor, a microprocessor mounted within a second housing, the second housing in mating relation to the first housing and electrically connected to the rotor position encoder, the second housing having a serial data communications port connectable to a remote digital computer issuing a desired rotor position command using serial digital data, the microprocessor having software which receives desired position commands through the communications port, repeatedly computes error signals between the desired position command and the measured position of the rotor as transmitted by the encoder, and reduces the error signals to zero, whereby the microprocessor operates as a position based, servo system within the second housing to bring the rotor within the first housing to the desired position defined by the remote digital computer.

27. The motor and controller of claim 26 wherein said microprocessor is adapted to further receive other commands corresponding to desired motor motion that are selected from the group consisting of relative rotor position, maximum allowable velocity, rotor acceleration, torque magnitude and drive current limit.

28. The motor and controller of claim 27 wherein said desired rotor position command and said other commands have up to a 32-bit resolution.

29. The motor and controller of claim 26 wherein said microprocessor produces an actuation signal to direct a proportional-integral-derivative (PID) filter connected to said microprocessor, said PID filter providing servo control of a drive amplifier supplying current to said motor.

30. The motor and controller of claim 26 wherein said microprocessor is also in output data communication with said remote computer to provide motor position information to said remote computer.

31. The motor and controller of claim 26 wherein said serial data communications port is an RS-232 port.

32. An integrated motor device, comprising:

a body housing a direct-current motor having a rotor, a stator, and means for determining a position of said rotor relative to said stator;

an encasement housing a controller, with said encasement removably connected to said body, said controller in electrical communication with both said motor and said position determining means and including a microprocessor, servo means for controlling a quantity of motion of said rotor as directed by said microprocessor, and associated drive means responsive to said servo means for producing said motion of said rotor; and means for synchronizing said controller with a controller of at least one other like integrated motor device, whereby a plurality of integrated motor devices may be synchronously interconnected.

33. The motor device of claim 32 wherein said means for synchronizing includes a synchronization pin in communication with said controller housed in said encasement.

34. The motor device of claim 33 wherein said means for synchronizing further includes an internal timer of said microprocessor responsive to said synchronization pin.

35. The motor device of claim 32 wherein said means for synchronizing initiates motion of said rotor, whereby all rotors of a plurality of interconnected integrated motor devices will start simultaneously.

* * * * *

REEXAMINATION CERTIFICATE (4593rd)
United States Patent
Bigler et al.

(10) Number: US 5,912,541 C1
(45) Certificate Issued: Jun. 11, 2002

(54) INTEGRATED DC SERVO MOTOR AND CONTROLLER

(75) Inventors: Robert A. Bigler; Punita Pandit, both of Cupertino, CA (US)

(73) Assignee: Animatics Corporation, Santa Clara, CA (US)

Reexamination Request:
No. 90/005,639, Feb. 17, 2000
No. 90/005,936, Feb. 21, 2001

Reexamination Certificate for:
Patent No.: 5,912,541
Issued: Jun. 15, 1999
Appl. No.: 08/754,182
Filed: Nov. 22, 1996

Related U.S. Application Data

(63) Continuation of application No. 08/347,807, filed on Nov. 30, 1994, now abandoned.

(51) Int. Cl.$^7$ .................................................. H02P 5/06
(52) U.S. Cl. ........................ 318/600; 318/538; 318/625
(58) Field of Search .......................... 318/600, 538, 318/625, 565, 685, 616, 634, 640, 254, 138, 439, 560, 561; 310/47, 50, 42, 67 R, 68 R, 68 B, 58; 439/44, 631

(56) References Cited

U.S. PATENT DOCUMENTS

| | | | | |
|---|---|---|---|---|
| 4,618,808 A | * | 10/1986 | Ish-Shalom et al. | 318/696 |
| 4,893,068 A | * | 1/1990 | Evans, Jr. | 318/615 |
| 4,951,549 A | * | 8/1990 | Olson et al. | 91/363 R |
| 5,208,523 A | * | 5/1993 | Harman | 318/685 |
| 5,391,970 A | * | 2/1995 | Chaffee et al. | 318/618 |
| 5,610,487 A | * | 3/1997 | Hutsell | 318/560 |

FOREIGN PATENT DOCUMENTS

JP    59028519    2/1984

OTHER PUBLICATIONS

"LM628/620 User Guide", National Semiconductor Application Note AN–706, 1993.*

(List continued on next page.)

*Primary Examiner*—Jo Macaluso

(57) ABSTRACT

An integrated motion control device having a controller mated to a motor body with set of rigid, electrically conductive signal pins. The motor is direct-current and preferably brushless, and has Hall sensors within the motor body and an encoder at a back end for precisely determining rotor position. Signals from the Hall sensors and encoder are fed to a microprocessor contained in the controller and including a PID filter for servo control of the motor. The controller contains an amplifier for driving the motor and a power supply for providing appropriate levels of DC power to various elements of the controller and motor. All electrical signals between the motor and controller are transmitted via the pins, eliminating wiring harness of the prior art and related signal noise and wiring problems. The motor body and controller are affixed with a few screws, allowing the controller to be removed from the motor while the motor remains connected to an application. Communication ports are provided at a rear of the controller for connection to a computer or peripheral devices, and can be used to daisy-chain and synchronize a number of interconnected motors and controllers.

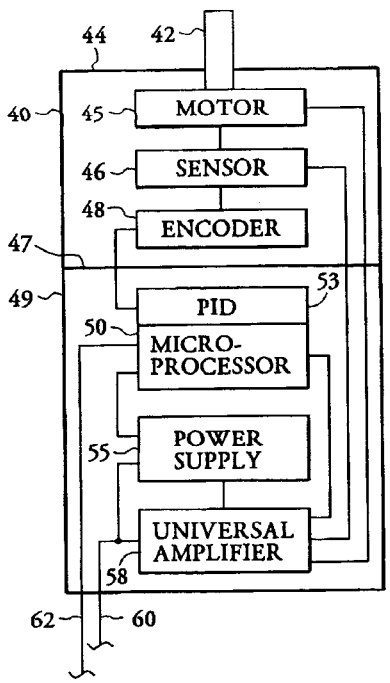

OTHER PUBLICATIONS

"Interfacing the HPC and LM629 for Motion Control", National Semiconductor Application Note AN–868, 1993.*

Intellimotor Series Brochure, Intellico, Inc., pp. 16 (1990).

Davis, "Smart Motor Integrates Hardware and Software," *PCIM*, pp. 6–7 (1989).

McGraw–Hill Dictionary of Scientific and Technical Terms, (4th ed.), pp. 367, 700, 1507, 1508, 1642, 1708, 1739, 1816 (1989).

Proceedings of the Fifth Annual Embedded Systems Conference, Part Number, vol. 2, 1993, pp. 231–242 vol. 2 2 vol. 1072 page(s), 3 references.

Elettronica Oggi, No. 69, Oct. 1988, pp. 67–75, 0 references.

Bridge Between Control Science and Technology, Proceedings of the Ninth Triennial World Congress of IFAC, 1985, pp. 2809–2813 vol. 5, 6 vol. (xiv+xii+xiv+xiv+xiv+xiv+3526) page(s), 8 references.

Mesures, spec. issue, , Sep. 18, 1984, pp. 45–48, 0 references.

News Release, 96–05–01.

* cited by examiner

US 5,912,541 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 20–46:

FIG. 3 shows a simplified axial view of a portion of the motor body 40 containing the motor 45 with a stator 98 outside and the rotor 42 at the center. *The rotor 42 is electrically insulated from the stator 98 contained in the motor body 40.* The rotor 42 is attached to a cylindrical permanent magnet 100 having a diameter larger than that of the rotor 42 and opposed north (N) and south (S) poles. Six windings, labeled 102, 104, 106, 108, 110, and 122 surround the permanent magnet 100, with adjacent windings being oppositely wound and thus producing oppositely directed magnetic fields when suppplied with electrical current. The windings are connected as pairs so that current flows through a pair of adjacent windings simultaneously to provide a torque to the magnet 100 and thereby turn the rotor 42. For example, pins 91 and 92 (FIG. 2B) provide and drain current from windings 102 and 104, respectively. Winding 102 is oriented so that current provided by from pin 91 creates a magnetic field having a north pole directed toward the rotor 42 and a south pole directed away from the rotor 42. Current from winding 102 flows to winding 104 by a wire, not shown, and drains from winding 104 through pin 92. Winding 104 is oriented so that this current creates a magnetic field with a south pole directed toward the rotor 42. With the north pole (N) of the magnet 100 oriented as shown in FIG. 3, the just described current in windings 102 and 104 produces a torque T that tends to cause magnet 100 and rotor 42 to rotate in a clockwise direction.

AS A RESULT OF REEXAMINATION, IT HAS BEEN DETERMINED THAT:

The patentability of claims 1–3, 12–25 and 32–35 is confirmed.

Claim 29 is cancelled.

Claims 4 and 26 are determined to be patentable as amended.

Claims 5–11, 27, 28, 30 and 31, dependent on an amended claim, are determined to be patentable.

New claims 36–100 are added and determined to be patentable.

4. The device of claim 1 wherein said sensing means includes an encoder attached to said body and connected to said controller, *and said means for deriving is a microprocessor,* said encoder *being* in signal communication with said microprocessor.

26. A motor and controller to be operated by a digital computer through a communications port for bringing a rotor of the motor to a target position comprising, a motor having a rotor disposed within a first housing,
a rotor position encoder associated with the rotor, the encoder producing an electrical signal indicating the measured position of the rotor, a microprocessor mounted within a second housing, the second housing in mating relation to the first housing and electrically connected to the rotor position encoder, the second housing having a serial data communications port connectable to a remote digital computer issuing a desired rotor position command using serial digital data, the microprocessor having software which receives desired position commands through the communications port, repeatedly computes error signals between the desired position command and the measured position of the rotor as transmitted by the encoder, and reduces the error signals to zero, whereby the microprocessor operates as a position based, servo system within the second housing to bring the rotor within the first housing to the desired position defined by the remote digital computer, *wherein said microprocessor produces an actuation signal to direct a proportional-integral-derivative (PID) filter connected to said microprocessor, said PID filter providing servo control of a drive amplifier supplying current to said motor.*

*37. A compact digitally servo controlled integrated motor device comprising,*

*a body housing a direct-current motor having a rotor, a stator and means for sensing motion of said rotor relative to said stator, defining sensed motion, and*

*an encasement housing a modular controller with said encasement having a cross-sectional area equal to a cross-sectional area of said body, said encasement mated to and removably connected by rigid connectors to said motor housed by said body, said controller being in feedback electrical communication with both said motor and said sensing means, and said controller including a proportional integral derivative servo control system which receives said feedback communication from said motor and said sensing means, drive means, in data communication with said proportional integral derivative servo control system, for producing a selected quantity of motion by said rotor, means for digitally storing data corresponding to motion parameters, said motion parameters including velocity and acceleration of said rotor with respect to said stator, and means, in data communication with both said sensing means and said storing means, for deriving variations between said sensed motion and one of said motion parameters, with said proportional integral derivative servo control system being adapted to sense said variations and produce an actuation signal corresponding thereto to vary an operation of said drive means to move said rotor in accordance with said motion parameters to produce said selected quantity of motion by said rotor.*

*37. The device of claim 36 further including a plurality of rigid pins protruding from said body and a plurality of corresponding holes formed in said controller, forming a plurality of wireless connections, with all electrical communication between said motor and said controller occurring through said plurality of wireless connections.*

*38. The device of claim 36 wherein said drive means includes an amplifier connected to a power supply and controlled by said deriving means, with said storing means adapted to contain up to 32 bits of information corresponding to each of said motion parameters.*

*39. The device of claim 36 wherein said sensing means includes an encoder attached to said body and connected to* said controller, said encoder in signal communication with said microprocessor.

40. The device of claim 36 wherein said rotor includes a magnet and said motor includes a plurality of hall sensors to sense a polarization of said magnet, with said hall sensors being in data communication with said deriving means.

41. The device of claim 36 wherein said sensing means is adapted to sense two thousand incremental positions of said rotor.

42. The device of claim 36 wherein said body and said controller are essentially cylindrical and have substantially similar diameters.

43. The device of claim 36 wherein said proportional integral derivative servo control system is adapted to operate at 5 kHz.

44. The device of claim 36 wherein said sensing means comprises of an optical encoder with said encasement defining a recess adapted to receive said rotor and said optical encoder upon said encasement being attached to said body, thereby shielding said encoder from ambient light.

45. The device of claim 36 wherein said sensing means precisely determines a plurality of positions of said rotor relative to said stator.

46. The device of claim 36 further including a plurality of first and second complementary connectors, with said plurality of first connectors rigidly attached to said body and in electrical communication with said motor and said plurality of second connectors rigidly attached to said encasement and in electrical communication with said controller, said first and second plurality of connectors being coupled together, providing electrical communication between said motor and said controller.

47. A compact digitally servo controlled integrated motor device comprising,
   a modular body housing a direct-current motor with a moveable rotor protruding from said body in a first direction and a plurality of rigid, electrically conductive pins protruding from said body in a second direction, said body including encoder means for sensing motion of said rotor compared to said body,
   a modular control unit having a plurality of holes fitting said pins to mate said control unit to said body, said control unit having a cross-sectional area equal to a cross-sectional area of said body, said modular control unit including a proportional integral derivative servo control system, a microprocessor, in data communication with both said encoder means and said control system via said pins, drive means, in data communication with said microprocessor and said proportional integral derivative servo control system, for moving said rotor in response to signals received from said microprocessor, and means for digitally storing data corresponding to motion parameters, said motion parameters including velocity and acceleration of said rotor with respect to said stator, wherein said drive means moves said rotor, with said encoder means transmitting information concerning motion of said rotor to said microprocessor, and said microprocessor determining variations between said motion sensed and one of said motion parameters and transmitting the same to said proportional integral derivative servo control system, with said proportional integral derivative servo control system transmitting a signal to said drive means to remove or reduce said variation determined, for moving said rotor in response to signals received from said microprocessor to yield fine resolution of said rotor.

48. The device of claim 47 wherein said control unit includes a communications port disposed distal to said holes for programming said microprocessor.

49. The device of claim 47 wherein said rotor is electrically insulated from a stator contained in said body.

50. The device of claim 47 wherein said storing means adapted to contain up to 32 bits of information corresponding to each of said motion parameters and said rotor includes a magnet and said motor includes a plurality of hall sensors to sense a polarization of said magnet, with said hall sensors being in data communication with said microprocessor.

51. The device of claim 47 wherein said encoder means is adapted to sense two thousand incremental positions of said rotor.

52. The device of claim 47 wherein said encoder means is in optical communication with said rotor and includes a source of light and a light detector, with said rotor formed with a plurality of surfaces having differing reflectivity, each of which corresponds to an angular position of said rotor different than an angular position with which the remaining surfaces correspond, wherein an angular position of said rotor is determined by said encoder means detecting an intensity of light reflected from said rotor.

53. A compact digitally servo controlled integrated motor device comprising,
   a modular body housing a direct-current motor having a rotor, a stator and means for determining a position of said rotor relative to said stator, said determining means including an encoder in optical communication with said rotor, said encoder including a source of light and a light detector, with said encoder adapted to transmit data corresponding to angular positions of said rotor with respect to said stator, defining sensed motion, and
   an encasement housing a modular controller with said encasement having a cross-sectional area equal to a cross-sectional area of said body, said encasement being removably connected to and mating said body, said controller being in electrical feedback communication with both said motor and said encoder, and including a proportional integral derivative servo control system, a drive means, in data communication with said proportional integral derivative servo control system, for producing a selected quantity of motion by said rotor, means for digitally storing data corresponding to motion parameters, said motion parameters including velocity and acceleration of said rotor with respect to said stator, and means, in data communication with both said encoder and said storing means, for deriving variations between said sensed motion and one of said motion parameters, with said proportional integral derivative servo control system, being adapted to sense said variations and produce an actuation signal corresonding thereto to vary an operation of said drive means to move said rotor in accordance with said motion parameters commands to produce said selected quantity of motion by said rotor to produce said selected quantity of motion by said rotor to yield fine resolution of said rotor.

54. The device of claim 53 wherein electrical signals travel between said body and said controller essentially only via signal pins.

55. A compact digitally servo controlled, integrated motor device, comprising:
   a modular motor body housing a direct current servo motor having a rotor and a stator;

an encoder associated with said servo motor and adapted to sense incremental angular positions of said rotor with respect to said stator, said encoded transmiting incremental position data corresponding to sensed motion of said rotor; and a modular control unit in the form of an encasement, removably connected to said motor body in mating relationship therewith, said encasement housing a controller with a drive amplifier for said motor whereby said motor, encoder, controller and drive amplifier form a fully integrated compact unit within said motor body and encasement, said controller including a microprocessor in data communication with a communications port on said encasement to receive one or more digital motion parameter commands from an external source through said port, available motion parameter commands that can be received including a set of commands that indicate a desired position, velocity and acceleration of said rotor, said microporcessor also in data communication with said encoder to receive said incremental position data transmitted from said encoder, said controller having a volume proportional to said motor volume, said microprocessor having means for digitally storing said received motion parameter commands, continually calculating and updating an actual rotor position from said received incremental position data, determining variations between the desired position or motion of said rotor corresponding to said stored motion parameter commands and the calculated actual position of said rotor, and producing an actuation signal to direct motion of said rotor in accordance with said motion parameter commands, said controller also including a proportional-integral-derivative (PID) servo control system in closed loop data communication with said encoder to receive said incremental position data therefrom and in closed loop data communication with said microprocessor to receive said actuation signal therefrom, said PID servo control system responsive to said incremental position data and said actuation signal to control operation of said drive amplifier, said drive amplifier in electrical communication with said motor to supply current to said stator to move said rotor in accordance with said motion parameter commands to said desired position.

56. The motor device of claim 55 wherein said servo motor is a brushless motor wherein said rotor is electrically insulated from said stator and includes a magnet, and wherein current supplied to windings of said stator generates a magnetic field that drives said rotor, said motor further including a plurality of Hall sensors to sense an orientation of said rotor magnet, said Hall sensors being in data communication with said PID servo control system.

57. The motor device of claim 55 wherein said encoder is an optical encoder including a source of light, a position indicator associated with said rotor having a plurality of optically contrasting portions thereon corresponding to different angular positions of said rotor, and a light detector positioned to detect changes in intensity of light received from said light source via said position indicator portions.

58. The motor device of claim 55 wherein said encoder is adapted to sense at least 2000 incremental angular positions of said rotor.

59. The motor device of claim 55 wherein said motion parameter commands indicate desired position, velocity and acceleration with a resolution up to 32 bits, said storing means adapted to contain said 32-bit motion parameter command information.

60. The motor device of claim 55 wherein said data and electrical communication between elements associated with said modular motor body and elements associated with said modular control unit are provided by a plurality of wireless complementary pin-and-hole connections fixed to the respective modules in mating relationship.

61. An integrated compact motor and controller to be operated by a digital computer through a communications port for bringing a rotor of the motor to a target position comprising, a motor having a rotor disposed within a first housing,
a rotor position encoder associated with the rotor, the encoder producing an electrical signal indicating the measured position of the rotor, a microprocessor mounted within a second housing, the second housing in mating relation to the first housing and electrically connected to the rotor position encoder, the second housing having a serial data communications port connectable to a remote digital computer issuing a desired rotor position command using serial digital data, the microprocessor having software which receives desired position commands through the communications port, repeatedly computes error signals between the desired position command and the measured position of the rotor as transmitted by the encoder, and reduces the error signals to zero, said microprocessor produces an actuation signal to direct a proportional-integral-derivative (PID) filter connected to said microprocessor, said PID filter providing servo control of a drive amplifier supplying current to said motor, thereby completing feedback control between said motor, encoder, microprocessor with PID filter, and said drive amplifier, whereby the microprocessor operates as a position based, servo system within the second housing to bring the rotor within the first housing to the desired position with fine resolution defined by the remote digital computer.

62. The motor and controller of claim 61 wherein said microprocessor is adapted to further receive other commands corresponding to desired motor motion that are selected from the group consisting of relative rotor position, maximum allowable velocity, rotor acceleration, torque magnitude and drive current limit.

63. The motor and controller of claim 62 wherein said desired rotor position command and said other commands have up to a 32-bit resolution.

64. The motor and controller of claim 61 wherein said microprocessor is also in output data communication with said remote computer to provide motor position information to said remote computer.

65. The motor and controller of claim 61 wherein said serial data communications port is an RS-232 port.

66. An integrated compact servo controlled motor device, comprising:

a body housing a direct-current motor having a rotor, a stator, and means for determining a position of said rotor relative to said stator;

an encasement housing a controller, with said encasement removably connected to and mating said motor housed by said body, said controller including a proportional-integral-derivative (PID) filter in feedback electrical communication with both said motor and said position determining means and including a microprocessor, servo means for controlling a quantity of motion of said rotor as directed by said microprocessor, and associated drive means responsive to said servo means for producing said motion of said rotor; and means for synchronizing said controller with a controller of at least one other like integrated motor device, whereby a plurality of integrated motor devices may be synchronously interconnected.

67. The motor device of claim 66 wherein said means for synchronizing includes a synchronization pin in communication with said controller housed in said encasement.

68. The motor device of claim 67 wherein said means for synchronizing further includes an internal timer of said microprocessor responsive to said synchronization pin.

69. The motor device of claim 66 wherein said means for synchronizing initiates motion of said rotor, whereby all rotors of a plurality of interconnected integrated motor devices will start simultaneously.

70. An integrated modular, mated combination motor and controller to be operated by a digital computer through a communications port for bringing a rotor of the motor to a target position comprising,
   a servo controlled motor having a rotor disposed within a first housing, a rotor position encoder associated with the rotor, the encoder producing an electrical signal indicating the measured position of the rotor, a microprocessor mounted within a second housing, the second housing in mating relation to the first housing and electrically connected to the rotor position encoder, the second housing having a serial data communications port connectable to a remote digital computer issuing a desired rotor position command using serial digital data, the microprocessor having a PID filter and software which receives desired position commands through the communications port, repeatedly computes error signals between the desired position command and the measured position of the rotor as transmitted by the encoder, and reduces the error signals to zero, whereby the microprocessor operates as a position based, servo system within the second housing to bring the rotor within the first housing to the desired position defined by the remote digital computer.

71. An integrated modular, mated combination motor and controller to be operated by a digital computer through a communications port for bringing a rotor of the motor to a target position comprising,
   a servo controlled motor having a rotor disposed within a first housing,
   a rotor position encoder associated with the rotor, the encoder producing an electrical signal indicating the measured position of the rotor, a controller having a microprocessor mounted within a second housing, the second housing in mating relation to the first housing and electrically connected to the rotor position encoder, the second housing having a serial data communications port connectable to a remote digital computer issuing a desired rotor position command using serial digital data, the microprocessor having a PID filter and software which receives desired position commands through the comunications port, repeatedly computes error signals between the desired position command and the measured position of the rotor as transmitted by the encoder, and reduces the error signals to zero, whereby the controller via said microprocessor operates as a position based, servo system within the second housing to bring the rotor within the first housing to the desired position defined by the remote digital computer.

72. A modular, mated, integrated combination motor and controller to be operated by a digital computer through a communications port for bringing a rotor of the motor to a target position comprising,
   a servo controlled motor having a rotor disposed within a first housing, a rotor position encoder associated with the rotor, the encoder producing an electrical signal indicating the measured position of the rotor,
   a modular conroller having a microprocessor mounted within a second housing, the second housing in mating relation to the first housing and electrically connected to the rotor position encoder, the second housing having a serial data communications port connectable to a remote digital computer issuing a desired rotor position command using serial digital data, the microprocessor having a PID filter and software which receives desired position commands through the communications port, repeatedly computes error signals between the desired position command and the measured position of the rotor as transmitted by the encoder, and reduces the error signals to zero, said microprocessor producing an actuation signal to direct the proportional-integral-derivative (PID) filter connected to said microprocessor, said PID filter providing servo control of a drive amplifier supplying current to said motor, whereby the microprocessor via said PID filter operates as a position based, servo system within the second housing to bring the rotor to fine resolution within the first housing to the desired position defined by the remote digital computer.

73. An mated motor and controller to be operated by a digital computer through a communications port for bringing a rotor of the motor to a target position comprising,
   a servo controlled motor having a rotor disposed within a first housing, a rotor position encoder associated with the rotor, the encoder producing an electrical signal indicating the measured position of the rotor,
   a modular controller having a microprocessor mounted within a second housing, the second housing in mating relation to the first housing and electrically connected to the rotor position encoder, said modular controller replaceable as a module by a like modular controller on said motor, the second housing having a serial data communications port connectable to a remote digital computer issuing a desired rotor position command using serial digital data, the microprocessor having a PID filter and software which receives desired position commands through the communications port, repeatedly computes error signals between the desired position command and the measured position of the rotor as transmitted by the encoder, and reduces the error signals to zero, whereby the microprocessor operates as a position based, servo system within the second housing to bring the rotor within the first housing to the desired position defined by the remote digital computer.

74. An integrated combination motor and controller to be operated by a digital computer through a communications port for bringing a rotor of the motor to a target position comprising,
   a servo controlled motor having a rotor disposed within a first housing, a rotor position encoder associated with the rotor, the encoder producing an electrical signal indicating the measured position of the rotor,
   a modular controller having a microprocessor mounted within a second housing, the second housing in mating relation to the first housing and electrically connected to the rotor position encoder, the second housing having a serial data communications port connectable to a remote digital computer issuing a desired rotor position command using serial digital data, the microprocessor having a PID filter and software which receives desired position commands through the communications port, repeatedly computes error signals between the desired position command and the measured position of the rotor as transmitted by the encoder, and reduces the error signals to zero, said microprocessor producing an actuation signal to direct the porportional-integral-derivative (PID) filter connect to said microprocessor, said PID filter providing servo control of a drive amplifier supplying current to said motor, whereby the microprocessor via said PID filter operates as position based, servo system within the second housing to bring the rotor to fine resolution within the first housing to the desired position defined by the remote digital computer, said modular controller having a volume proportional to the volume of said motor.

75. An integrated modular motor and controller to be operated by a digital computer through a communications port for bringing a rotor of the motor to a target position comprising,
   a servo controlled motor having a rotor disposed within a first housing, a rotor position encoder associated with the rotor adapted to sense two thousand incremental positions, the encoder producing an electrical signal indicating the measured position of the rotor,
   a controller having a microprocessor mounted within a second housing, the second housing in mating relation to the first housing end electrically connected to the rotor position encoder, the second housing having a serial data communications port connectable to a remote digital computer issuing a desired rotor position command using serial digital data, the microprocessor having software which receives desired position commands through the communications port, repeatedly computes error signals between the desired position command and the measured position of the rotor as transmitted by the encoder, and reduces the error signals to zero, said microprocessor producing an actuation signal to direct a proportional-integral-derivative (PID) filter connected to said microprocessor, said PID filter providing servo control of a drive amplifier supplying current to said motor, whereby the microprocessor via said PID filter operates as a position based, servo system within the second housing to bring the rotor within the first housing to the desired position defined by the remote digital computer.

76. An integrated modular combination motor and controller to be operated by a digital computer through communications port for bringing a rotor of the motor to a target position comprising,
   a servo controlled motor having a rotor disposed within a first housing, a rotor position encoder associated with the rotor, the encoder producing an electrical signal indicating the measured position of the rotor,
   a controller having a microprocessor mounted within a second housing, the second housing in mating relation by wireless connectors to the first housing and electrically connected to the rotor position encoder, the second housing having a serial data communications port connectable to a remote digital computer issuing a desired rotor position command using serial digital data, the microprocessor having software which receives desired position commands through the communications port, repeatedly computes error signals between the desired position command and the measured position of the rotor as transmitted by the encoder, and reduces the error signals to zero, said microprocessor producing an actuation signal to direct a proportional-integral-derivative (PID) filter connected to said microprocessor, said PID filter providing servo control of a drive amplifier supplying current to said motor, whereby the microprocessor via said PID filter operates as a position based, servo system within the second housing to bring the rotor within the first housing to the desired position defined by the remote digital computer.

77. A combination integrated motor and controller to be operated by a digital computer through a communications port for bringing a rotor of the motor to a target position comprising,
   a modular servo controlled motor having a rotor disposed within a first housing, a rotor position encoder associated with the rotor, the encoder producing an electrical signal indicating the measured position of the rotor,
   a modular controller having a microprocessor mounted within a second housing, the second housing in mating relation to the first housing and electrically connected by rigid connectors to the rotor position encoder, the second housing having a serial data comunications port connectable to a remote digital computer issuing a desired rotor position command using serial digital data, the microprocessor having software which receives desired position commands through the communications port, repeatedly computes error signals between the desired position command and the measured position of the rotor as transmitted by the encoder, and reduces the error signals to zero, said microprocessor having a plurality of stacked circuit boards and producing an actuation signal to direct a proportional-integral-derivative (PID) filter connected to said microprocessor, said PID filter providing servo control of a drive amplifier supplying current to said motor, whereby the microprocessor via said PID filter operates as a position based, servo system within the second housing to bring the rotor within the first housing to the desired position defined by the remote digital computer.

78. A combination integrated motor and controller to be operated by a digital computer through a communications port for bringing a rotor of the motor to a target position comprising,
   a modular servo controlled motor having a rotor disposed within a first housing, a rotor position encoder associated with the rotor, the encoder producing an electrical signal indicating the measured position of the rotor,
   a modular controller having a microprocessor mounted within a second housing, the second housing in mating relation to the first housing and electrically connected to the rotor position encoder, said modular controller replaceable as a module by a like modular controller on said motor, the second housing having a serial data communications port connectable to a remote digital computer issuing a desired rotor position command using serial digital data, the microprocessor having software which receives desired position commands through the communications port, repeatedly computes error signals between the desired position command and the measured position of the rotor as transmitted by the encoder, and reduces the error signals to zero, said microprocessor producing an actuation signal to direct a proportional-integral-derivative (PID) filter connected to said microprocessor, said PID filter providing servo control of a drive amplifier supplying current to said motor, whereby the microprocessor via said PID filter operates as a position based, servo system within the second housing to bring the rotor within the first housing to the desired position defined by the remote digital computer.

79. An integrated motor and controller to be operated by a digital computer through a communications port for bringing a rotor of the motor to a target position comprising,
a servo controlled motor having a rotor disposed within a first housing, a rotor position encoder associated with the rotor, the encoder producing an electrical signal indicating the measured position of the rotor,
a controller having a microprocessor mounted within a second housing, the second housing in mating relation to the first housing and electrically connected to the rotor position encoder, the second housing having a serial data communications port connectable to a remote digital computer issuing a desired rotor position command using serial digital data, the microprocessor having software which receives desired position commands through the communications port, repeatedly computes error signals between the desired position command and the measured position of the rotor as transmitted by the encoder, and reduces the error signals to zero, said microprocessor producing an actuation signal to direct a proportional-integral-derivative (PID) filter connected to said microprocessor, said PID filter providing servo control of a drive amplifier supplying current to said motor, whereby the microprocessor via said PID filter operates as a position based, servo system within the second housing to bring the rotor within the first housing to the desired position defined by the remote digital computer, said controller having a length proportional to a length of said motor.

80. An integrated motor and controller to be operated by a digital computer through a communications port for bringing a rotor of the motor to a target position comprising,
a servo controlled motor having a rotor disposed within a first housing, a rotor position encoder associated with the rotor, the encoder producing an electrical signal indicating the measured position of the rotor,
a controller having a microprocessor mounted within a second housing, the second housing in mating relation to the first housing and electrically connected to the rotor position encoder, the second housing having a serial data communications port connectable to a remote digital computer issuing a desired rotor position command using serial digital data, the microprocessor having software which receives desired position commands through the communications port, repeatedly computes error signals between the desired position command and the measured position of the rotor as transmitted by the encoder, and reduces the error signals to zero, said microprocessor producing an actuation signal to direct a proportional-integral-derivative (PID) filter connected to said microprocessor, said PID filter providing servo control of a drive amplifier supplying current to said motor, whereby the microprocessor via said PID filter operates as a fine resolution position based, servo system within the second housing to bring the rotor within the first housing to the desired position defined by the remote digital computer, said mated motor and controller fitting in a lateral space the same as the motor would fit in alone.

81. The motor and controller as in any one of claims 70–75, and 78–80, inclusive further including first and second complementary rigid connections, with said first connections rigidly attached to and in electrical communication with said encoder and said second connections rigidly attached to and in electrical communication with said microprocessor, said first and second plurality of connections being coupled together, providing wireless electrical communication between said encoder and said mircroprocessor.

82. The motor and controller as in any one of claims 70 to 80 inclusive, wherein said microprocessor is adapted to further receive other commands corresponding to desired motor motion that are selected from the group consisting of relative rotor position, maximum allowable velocity, rotor acceleration, torque magnitude and drive current limit.

83. The motor and controller as in any one of claims 70 to 80 inclusive, wherein said desired rotor position command and said other commands a 32-bit resolution.

84. The motor and controller as in any one of claims 70 to 80 inclusive, wherein said microprocessor is also in output data communication with said remote computer to provide motor position information to said remote computer.

85. The motor and controller as in any one of claims 70 to 80 inclusive, wherein said proportional integral derivative (PID) servo control system operates is adapted to operate at 5 kHz.

86. A digitally servo controlled, integrated motor device, comprising:
a modular motor body housing a direct current servo motor having a rotor and a stator;
an encoder associated with said servo motor and adapted to sense incremental angular positions of said rotor with respect to said stator, said encoded transmitting incremental position data corresponding to sensed motion of said rotor; and
a modular control unit in the form of an encasement, removably connected to said motor body in mating relationship therewith, said encasement housing a controller with a drive amplifier for said motor whereby said motor, encoder, controller and drive amplifier form a fully integrated compact unit within said motor body and encasement, said controller including a microprocessor in data communication with a communications port on said encasement to receive one or more digital motion parameter commands from an external source through said port, available motion parameter commands that can be received including a set of commands that indicate a desired position, velocity and acceleration of said rotor, said microprocessor also in data communication with said encoder to receive said incremental position data transmitted from said encoder, said microprocessor having means for digitally storing said received motion parameter commands, continually calculating and updating an actual rotor position from said received incremental position data, determining variations between the desired position or motion of said rotor corresponding to said stored motion parameter commands and the calculated actual position of said rotor, and producing an actuation signal to direct motion of said rotor in accordance with said motion parameter commands, said controller also including a proportional-integral-derivative (PID) servo control system in closed loop data communication with said encoder to receive said incremental position data therefrom and in closed loop data communication with said microprocessor to receive said actuation signal therefrom, said PID servo control system adapted to operate at a service rate of 5 kHz and responsive to said incremental position data and said actuation signal to control operation of said drive amplifier, said drive amplifier in electrical communication with said motor to supply current to said stator to move said rotor in accordance with said motion parameter commands.

87. A digitally servo controlled, integrated motor device, comprising:
a modular motor body housing a direct current servo motor having a rotor and a stator;
an encoder associated with said servo motor and adapted to sense incremental angular positions of said rotor with respect to said stator, said encoded transmitting incremental position data of at least 2000 incremental angular positions corresponding to sensed motion of said rotor; and
a modular control unit in the form of an encasement, removably connected to said motor body in mating relationship therewih, said encasement housing a controller with a drive amplifier for said motor whereby said motor, encoder, controller and drive amplifier form a fully integrated compact unit within said motor body and encasement, said controller including a microprocessor in data communication with a communications port on said encasement to receive one or more digital motion parameter commands from an external source through said port, available motion parameter commands that can be received including a set of commands that indicate a desired position, velocity and acceleration of said rotor, said microprocessor also in data communication with said encoder to receive said incremental position data transmitted from said encoder, said microprocessor having means for digitally storing said received motion parameter commands, continually calculating and updating an actual rotor position from said received incremental position data, determining variations between the desired position or motion of said rotor corresponding to said stored motion parameter commands and the calculated actual position of said rotor, and producing an actuation signal to direct motion of said rotor in accordance with said motion parameter commands, said controller also including a proportional-integral-derivative (PID) servo control system in feedback data communication with said encoder to receive said incremental position data therefrom and in data communication with said microprocessor to receive said actuation signal therefrom, said PID servo control system reponsive to said incremental position data and said actuation signal to control operation of said drive amplifier, said drive amplifier in electrical communication with said motor to supply current to said stator to move said rotor in accordance with said motion parameter commands to said desired position.

88. A digitally servo controlled, integrated motor device, comprising:
a modular motor body housing a direct current servo motor having a rotor and a stator;
an optical encoder associated with said servo motor and adapted to sense incremental angular positions of said rotor with respect to said stator, said encoded transmitting incremental position data corresponding to sensed motion of said rotor; and
a modular control unit in the form of an encasement, removably connected by rigid connectors to said motor body in mating relationship therewith, said encasement housing a controller with a drive amplifier for said motor whereby said motor, encoder, controller and drive amplifier form a fully integrated compact unit with said motor body and encasement, said controller including a mirco-processor in data communication with a communications port on said encasement to receive one or more digital motion parameter commands from an external source through said port, available motion parameter commands that can be received including a set of commands that indicate a desired position, velocity and acceleration of said rotor, said microprocessor also in data communication with said encoder to receive said incremental position data transmitted from said encoder, said microprocessor having means for digitally storing said received motion parameter commands, continually calculating and updating an actual rotor position from said received incremental position data, determining variations between the desired position or motion of said rotor corresponding to said stored motion parameter commands and the calculated actual position of said rotor, and producing an actuation signal to direct motion of said rotor in accordance with said motion parameter commands, said controller also including a proportional-integral-derivative (PID) servo control system in closed loop data communication with said encoder to receive said incremental position data therefrom and in closed loop data communication with said microprocessor to receive said actuation signal therefrom, said PID servo control system responsive to said incremental position data and said actuation signal to control operation of said drive amplifier, said drive amplifier in electrical communication with said motor to supply current to said stator to move said rotor in accordance with said motion parameter commands to the desired position, said controller having a plurality of stacked circuit boards.

89. The device of claims 84 to 88 further including first and second complementary connectors, with said plurality of first connectors rigidly attached to and in electrical communication with said motor body housing and said plurality of second connectors rigidly attached to in electrical communication with said controller, said first and second plurality of connectors being coupled together, providing electrical communication between said motor and said controller.

90. A digitally servo controlled, integrated motor device, comprising:
a modular motor body housing a direct current servo motor having a rotor and a stator;
an encoder associated with said servo motor and adapted to sense incremental angular positions of said rotor with respect to said stator, said encoded transmitting incremental position data corresponding to sensed motion of said rotor; and
a modular control unit in the form of an encasement, removably connected to said motor body in mating relationship therewith, said encasement housing a controller with a drive amplifier for said motor whereby said motor, encoder, controller and drive amplifier form a fully integrated compact unit with said motor body and encasement, said controller including a microprocessor in data communication with a communications port on said encasement to receive one or more digital motion parameter commands from an external source through said port, available motion parameter commands that can be received including a set of
commands that indicate a desired position, velocity and
acceleration of said rotor, said microprocessor also in
data communication with said encoder to receive said
incremental position data transmitted from said
encoder, said microprocessor having means for digitally
storing said received motion parameter
commands, continually calculating and updating an
actual rotor position from said received incremental
position data, determining variations between the
desired position or motion of said rotor corresponding
to said stored motion parameter commands and the
calculated actual position of said rotor, and producing
an actuation signal to direct motion of said rotor in
accordance with said motion parameter commands,
said controller also including a proportional-integral-
derivative (PID) servo control system in closed loop
data communication with said encoder to receive said
incremental position data therefrom and in closed loop
data communication with said microprocessor to
receive said actuation signal therefrom, said PID servo
control system responsive to said incremental position
data and said actuation signal to control operation of
said drive amplifier, said drive amplifier in electrical
communication with said motor to supply current to
said stator to move said rotor in accordance with said
motion parameter commands to the desired position
with fine resolution, said control unit fitting in a lateral
space the same as the motor would fit in alone.

91. The motor device of any one of claims 86 to 90 inclusive, further including first and second complementary connectors, with said first connector rigidly attached to and in electrical communication with said motor body housing and said second connector rigidly attached to in electrical communication with said control unit, said first and second connectors being coupled together, providing electrical communication between said motor and said controller.

92. The motor device of claim 91, wherein one of said first connector or second connector further including a plurality of rigid pins protruding, and the other of said connectors including a plurality of corresponding holes to form a plurality of wireless connections, with such electrical communication between said motor and said controller occurring through said plurality of wireless connections.

93. The motor device of any one of claims 86 to 90 inclusive, wherein said microprocessor is adapted to further receive other commands corresponding to desired motor motion that are selected from the group consisting of relative rotor position, maximum allowable velocity, rotor acceleration, torque magnitude and drive current limit.

94. The motor device of claim 91 wherein said desired rotor position command and said other commands have up to a 32-bit resolution.

95. The motor device of any one of claims 86 to 90 inclusive, wherein said external source is a remote computer, and said microprocessor is also in output data communication with said remote computer to provide motor position information to said remote computer.

96. The motor device of any one of claims 86 to 90 inclusive, wherein said encoder comprises of an optical encoder with said control unit defining a recess adapted to receive said rotor and said optical encoder upon said control unit being attached to said motor body, thereby shielding said encoder from ambient light.

97. The motor device of any one of claims 87 to 90 inclusive, wherein said PID operates at 5 kHz, whereby said encoder precisely determines a plurality of positions of said rotor relative to said stator with fine precision.

98. The motor device of any one of claims 86–90 inclusive, wherein said external source is a remote computer connected to a display.

99. An integrated motor device, comprising:

a body housing a direct-current servo controlled motor having a rotor, a stator, and means for determining a position of said rotor relative to said stator;

an encasement housing a modular controller, with said encasement removably connected to said body, said controller in electrical feedback communication with both said motor and said position determining means and including a microprocessor, servo means for controlling a quantity of motion of said rotor as directed by said microprocessor, and associated drive means responsive to said servo means for producing said motion of said rotor; and means for synchronizing said controller with a controller of at least one other like integrated motor device, whereby a plurality of integrated motor devices may be synchronously interconnected.

100. An integrated motor device, comprising:

a body housing a direct-current servo controlled motor having a rotor, a stator, and means for determining a position of said rotor relative to said stator;

an encasement housing a modular controller, with said encasement removably connected to said body, said controller in electrical feedback communication with both said motor and said position determining means and including a microprocessor having a proportional-integral-derivative (PID) filter, servo means for controlling a quantity of motion of said rotor as directed by said microprocessor via said PID filter, and associated drive means responsive to said servo means for producing said motion of said rotor; and means for synchronizing said controller with a controller of at least one other like integrated motor device, whereby a plurality of integrated motor devices may be synchronously interconnected.

* * * * *